(No Model.)
T. A. EDISON.
INCANDESCENT ELECTRIC LAMP.
No. 251,548. Patented Dec. 27, 1881.
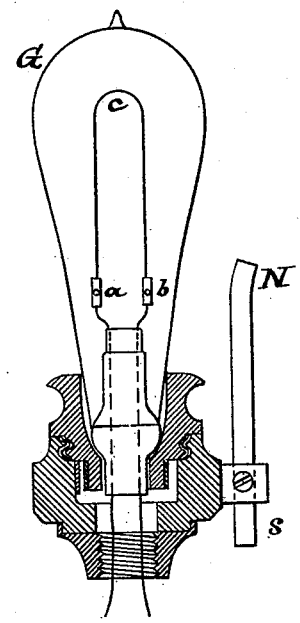
Attest.
Chas Raettig.
O. D. Mott.
Inventor.
T. A. Edison
pr Dyer & Wilber
Attys.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

INCANDESCENT ELECTRIC LAMP.

SPECIFICATION forming part of Letters Patent No. 251,548, dated December 27, 1881.

Application filed January 31, 1881. (No model.)

*To all whom it may concern:*

Be it known that I, THOMAS A. EDISON, of Menlo Park, in the county of Middlesex and State of New Jersey, have invented a new and useful Incandescent Electric Lamp; and I do hereby declare that the following is a full and exact description of the same, reference being had to the accompanying drawing, and to the letters of reference marked thereon.

The object of this invention is to provide an incandescent electric lamp consisting of a carbon filament hermetically sealed in an exhausted glass containing-chamber, with means whereby the carbon particles thrown off by the carbon filament may be attracted downwardly, in order that the formation of an arc between the limbs of the carbon, and also whereby the blackening of the inclosing glass chamber above the base of the carbon by the deposition thereon of the carbon particles referred to, may be avoided. This I accomplish by combining with each lamp a magnet arranged relatively to the carbon filament, so that it will attract the highly electrified carbon vapor within the glass containing-chamber downwardly. An illustration of this is given in the drawing, which is a view of a lamp with a magnet attached, in which—

G is a lamp consisting of a hermetically-sealed exhausted glass globe, within which the carbon filament *c* is secured in clamps *a b*. Upon the side of the lamp, and in suitable supports, is fixed the magnet N S, whose upper end reaches preferably to about the height of the clamps.

If the magnet be placed, as shown, with its N pole uppermost, it is to be arranged upon the positive side of the lamp; if with the S pole uppermost, then upon the negative side of the lamp.

It is evident that variations may be made. For instance, an electro-magnet may be used instead of the permanent magnet; or a two-limbed magnet may be used, its poles being properly disposed in relation to the positive and negative sides of the carbon filament; or the single or double limbed magnet may be placed within the glass inclosing-globe; or, instead of a regular magnet, a coil of wire through which a current is passed may be used.

The magnet or current used may be a very weak one, as such will suffice to deflect electrified carbon vapor.

What I claim is—

1. The combination, with an incandescent electric lamp, of a magnet for preventing the deposition of carbon upon the upper part of the glass inclosing-globe, substantially as set forth.

2. The combination, with an incandescent electric lamp, of a magnet for attracting downwardly, or to the base of the lamp, the electrified carbon vapor formed therein, substantially as described.

This specification signed and witnessed this 19th day of January, 1881.

THOS. A. EDISON.

Witnesses:
H. W. SEELY,
ERNEST J. BERGGREN.